April 13, 1943.  J. E. HUGUELET  2,316,166
WIRING DUCT
Filed Sept. 4, 1940  4 Sheets-Sheet 1
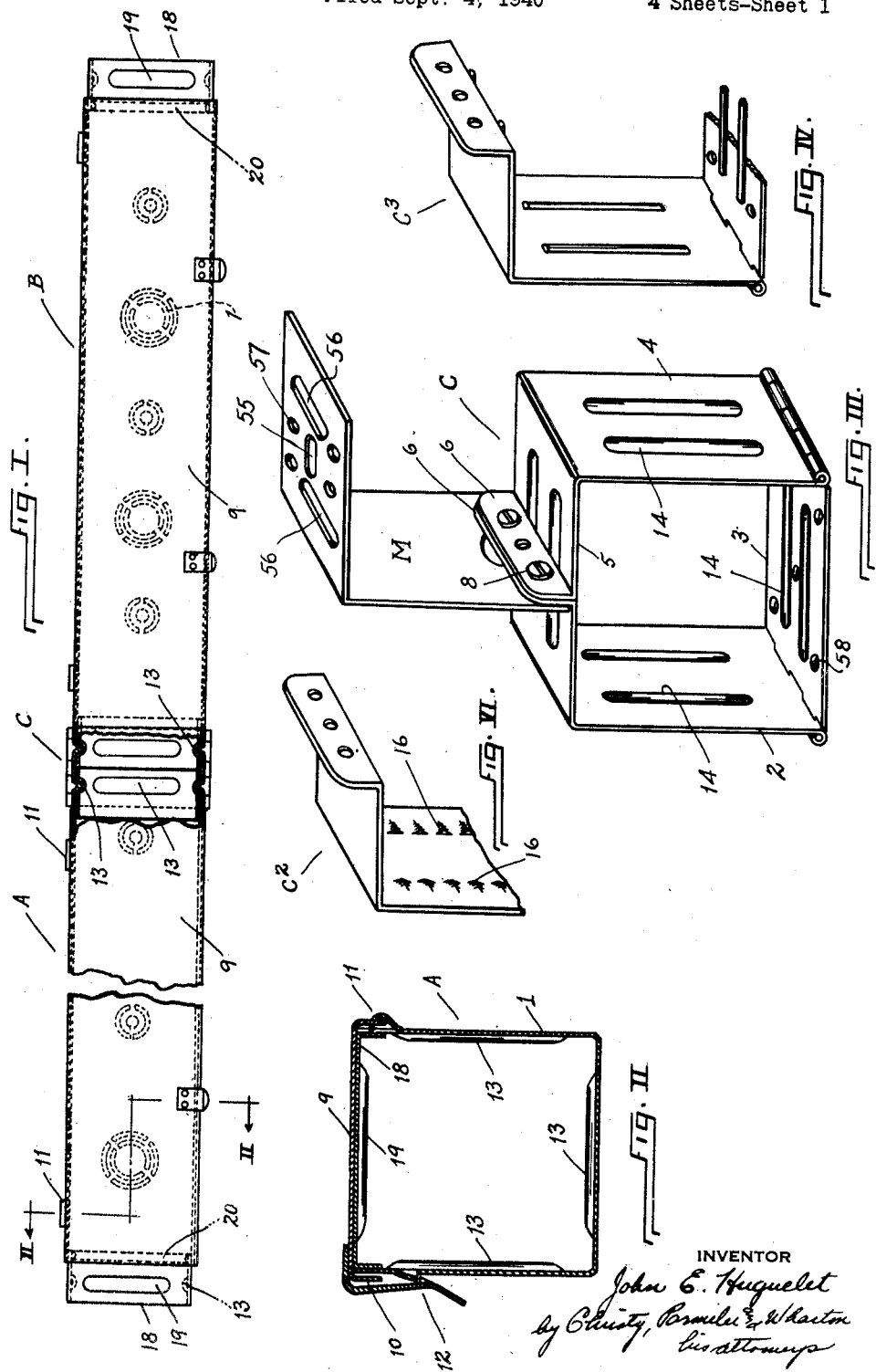

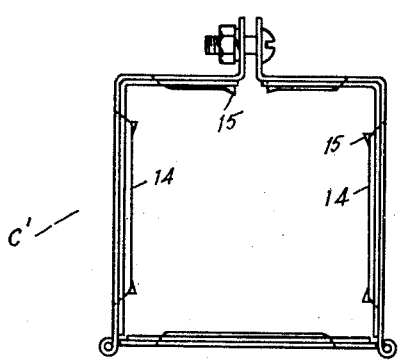
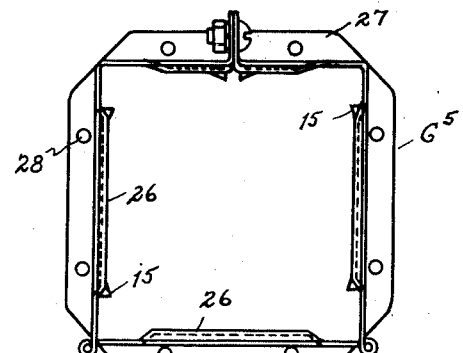
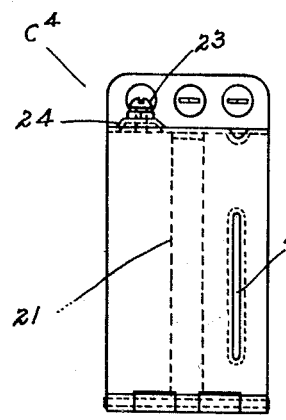
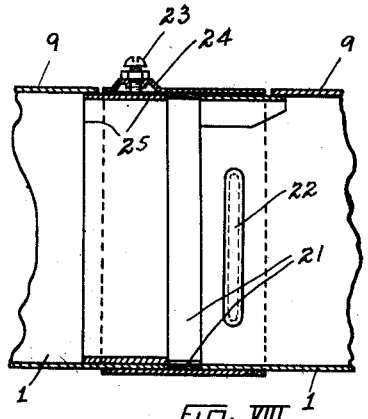
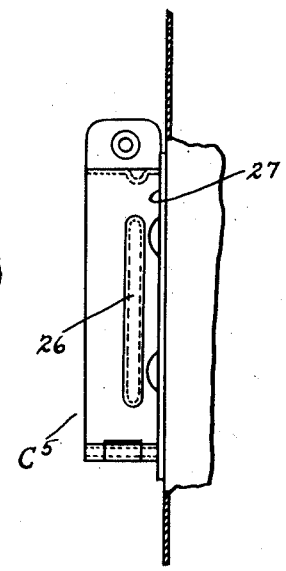
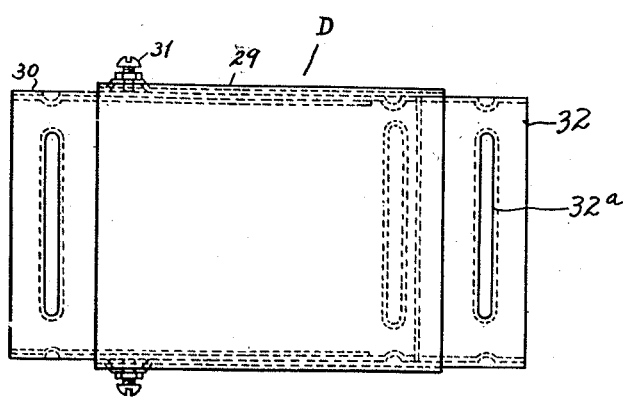

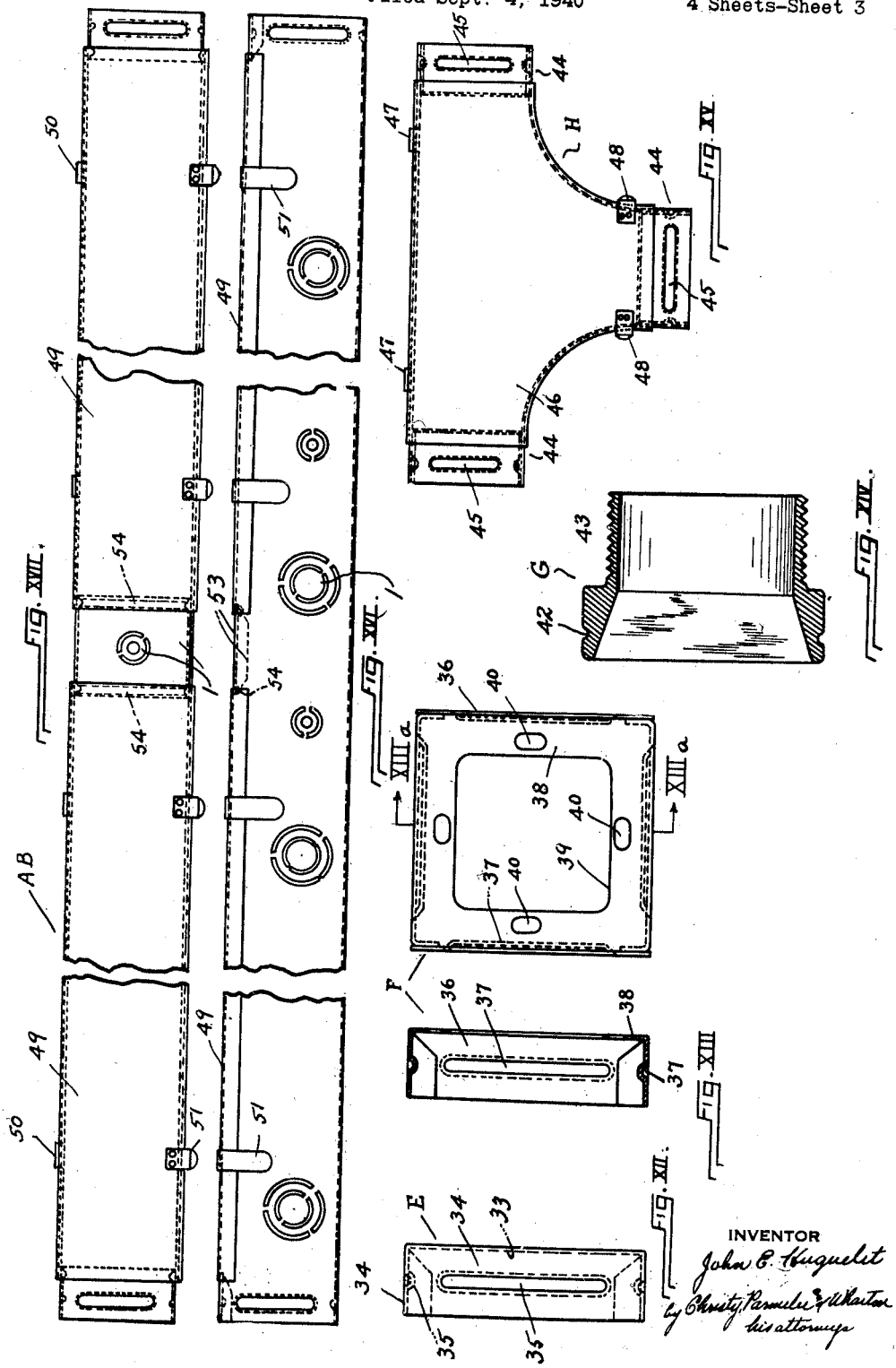

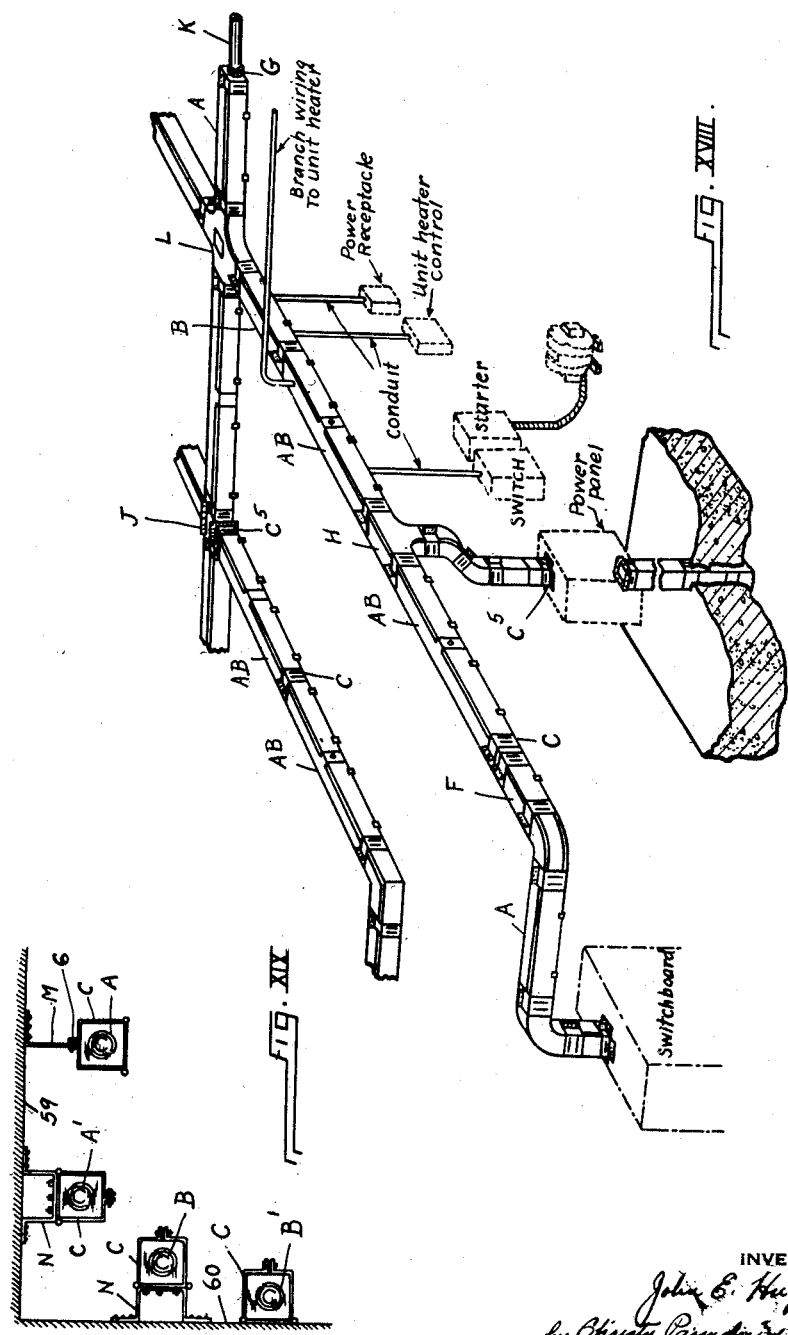

Patented Apr. 13, 1943

2,316,166

UNITED STATES PATENT OFFICE 2,316,166

WIRING DUCT

John E. Huguelet, Mount Lebanon, Pa., assignor to National Electric Products Corporation, a corporation of Delaware Application September 4, 1940, Serial No. 355,328

5 Claims. (Cl. 138—75)

This invention relates to wiring duct of a type particularly suited to installation in factories, public buildings, and like structures in which it is useful to have an accessible duct capable of housing a number of conductor wires of relatively small diameter, or several large diameter conductors.

Objects of my invention are to provide a duct assembly of the above-indicated sort, the sections of which are easily and quickly connected in making the assembly, and in which the sections are firmly engaged to each other to form a neat, permanent, and rigid enclosed housing, which possesses all the convenience and utility for the making of branch connections that is to be found in a temporary exposed wiring system. Other objects of my invention are to provide a duct of the above-indicated sort which may be installed directly on walls, bench backs, or ceilings, or which may be suspended from ceilings, bracketed out from walls, or otherwise mounted by means of standard hangers or brackets. Other objects of my invention are to provide wiring duct of the indicated sort, in which the connection between duct sections is simple, and is of such sort that the making of the connection may be accommodated to the location in which the duct is mounted, to permit the duct to lie flush with a wall or ceiling when so desired; in which the fastening for the interconnection of duct sections, includes a minimum of parts and a minimum of operations in making assembly; and in which the removable fastening elements of the duct assembly are readily accessible.

In the accompanying drawings, illustrating an embodiment of my invention,

Fig. I is a primarily elevational view showing two interconnected duct sections of the duct assembly, or system, and is partly in section in the region of the interconnection between duct sections. This figure of the drawings shows two duct sections of simple straight-away form, the better to illustrate the principles involved.

Fig. II is a detail cross-sectional view through a duct section, taken on the section line II—II of Fig. I.

Fig. III is an isometric detail view of a coupling clamp for securing together adjacent duct sections, and shows the coupling clamp engaging a hanger for mounting the duct assembly in installation.

Fig. IV is a fragmentary isometric detail view, showing a modification in the structure of the coupling clamp.

Fig. V is a detail end elevation of the coupling clamp, showing another structural modification in the clamp.

Fig. VI is a fragmentary isometric detail view, showing a still further modification in the structure of the coupling clamp.

Fig. VII is a side elevation of a form of coupling clamp, following the principles of the forms of coupling clamp shown in preceding figures of the drawings, but organized to serve as an extension coupling in making accommodation to a predetermined length for a run of the duct.

Fig. VIII is a fragmentary detail vertical sectional view showing the "piece-out" coupling clamp of Fig. VII in association with two duct sections which it is used to connect.

Fig. IX is an end elevation of a coupling clamp organized for connection of a duct section to the wall of an outlet box, or other housing structure.

Fig. X is a side elevation of the coupling clamp shown in Fig. IX, showing the clamp attached to an outlet box wall.

Fig. XI is a side elevation of a slip-coupling organized for use as an adapter between duct sections, and constructed for connection to duct sections by a coupling clamp, such as the coupling clamp of Fig. III.

Fig. XII is a side elevation of end closure made for connection at the end of a duct section by a coupling clamp, such as the coupling clamp of Fig. III.

Fig. XIII is a view showing in rear elevation an adapter piece, organized for connection to a duct section by a coupling clamp such as the coupling clamp of Fig. III, and for connection to the flange or wall of another housing element, such as an outlet box or flanged duct section.

Fig. XIIIa is a central vertical sectional view through the adapter piece of Fig. XIII, taken in the plane of the section line XIIIa—XIIIa of Fig. XIII.

Fig. XIV is a vertical section through an adapter piece organized for connection to a duct section by a coupling clamp, such as the coupling clamp of Fig. III, and for connection to junction boxes, and to tubular conduit, or conduit fittings.

Fig. XV is a plan view of a T-connection organized for connection to duct sections by coupling clamps such as the coupling clamp of Fig. III. This T-connection may be taken as exemplary of various housing shapes which may similarly be connected in a duct system or installation.

Fig. XVI is a side elevation of a straight-away duct section more elongate than the duct sections of Fig. I, showing an accommodation in the cover structure of the section to the relatively great length of the section.

Fig. XVII is a plan view of the elongate duct section shown in Fig. XVI.

Fig. XVIII is an isometric view of a typical duct installation in accordance with my invention, illustrating the use of several specialized section forms in addition to straight-away duct sections and couplings.

Fig. XIX is an end elevational view of several duct sections, showing various ways of mounting the duct sections on a wall and ceiling.

In Fig. I of the drawings, there is shown two rigid duct sections A and B. Both the duct sections A and B are rectangular in cross section, and both sections are provided with knock-out holes 1 for the entry, or exit, of conduits or cables. Throughout the various figures of the drawings, such knock-outs, if not shown, are to be assumed optionally provided in the walls of the various duct sections. The two duct sections A and B are shown interconnected, and it is to be understood that throughout the entire duct system or installation, regardless of the form of the duct sections, or the specific structure of the connectors employed in each instance, connection is made in accordance with the same general principle.

As to the interconnection between duct sections, it may initially be explained that it is rigidly made without the use of matching flanges extended at right angles around the duct walls at the ends of the section, and without nesting the sections at their ends one within the other. To make the interconnection between duct sections, using structures herein illustrated, the sections are arranged simply end-to-end, and the regions of both sections adjacent their ends have common engagement with a connector clamp C arranged to embrace the adjacent ends of the duct section, and clampingly to engage them against movement relative to each other. As shown in Fig. III of the drawings, this clamp C has four sides, 2, 3, 4 and 5, arranged in rectangular form to match the rectangular cross section of the duct sections, and is hinged at the junction lines between the sides 2 and 3, and the sides 3 and 4, of the clamp. The side 5 of the clamp is divided, and along its dividing line has transversely-extending lugs 6, upstanding from the plane of the side 5, and having matching perforations 7 to receive screw-bolts 8. With this clamp placed around both duct sections in the regions of both near their adjacent ends, the clamp as a whole embracingly engages the duct sections to prevent relative movement between those sections.

Assuming that the clamp C is applied to two duct sections at their adjacent ends, clampingly to engage them to each other, it will lie on three sides of the duct assembly approximately flush with the duct walls, projecting therefrom substantially only at that side of the clamp from which the lugs 6 project. Each of the duct sections A and B has thereon a cover 9 hinged at 11 near the edge of one of the three walls of the trough portion 1 of the duct to overlie, and form a closure for, the open side of the duct. Along its edge opposite that at which it is hinged, the cover 9 has a dependent flange 10, and there are engaging means 12 arranged functionally between the cover and trough. It will be seen in Fig. I of the drawings that the edges of the cover across the trough lie against the edges of the connector clamps C uniting the sections.

I prefer to give the clamp a positive engagement with both the duct sections and the clamp by forming simply matching indentations on the duct sections and on the clamp to give the effect of a groove and tongue engagement between them. As shown, each of the three sides of the trough portion 1 of each duct section, has therein relatively elongate indentations 13, extending across each side of the trough, and the clamp C has in its sides elongate indentations, or grooves, arranged to lie inwardly of the clamp as tongues, or keys, 14 to cooperate with the indented grooves in the duct sections. In the clamp two sets of these interlocking grooves are formed parallel to each other around the clamp, and these sets are spaced from each other a distance equal to the spacing between the grooves in the two duct sections, when the duct sections are placed in end abutment with each other. Its hinge structure making it flexible, when the clamp C, is closed about the two duct sections, the projections of the clamp enter the grooves of the duct sections and lie therein, definitely to prevent movement of the duct sections relatively to each other in any direction.

Whether or no the clamp and duct sections be provided with any cooperative interlocking structure, I desirably make at least that side 5 of the clamp which carries the upstanding lugs 6 somewhat shorter than the width of the duct sections to increase the compressive engagement of the clamp with the duct sections when the lugs are brought into contact with each other.

It is usual to apply a dense and relatively heavy enamel coating to the duct sections and to the clamps, to protect those elements against rusting, and to improve the appearance of a duct assembly when installed. As the duct sections lie merely in end contact with each other, it is desirable that grounding continuity throughout an installed duct assembly be had through the several clamps included in the assembly. The enamel coating carried by the duct sections is a material possessing high properties of electrical insulation. In the modification of Fig. V, the tongues, or keys, 14 have at one end of each a sharp spur, or teat 15. When the coupling clamp $C^1$ of Fig. V is connected with a duct section, the spurs or teats 15 score through the enamel coating in the grooves 13 of the duct section to make a good metal-to-metal contact between the duct section and the clamp.

In the clamp shown in Fig. VI of the drawings the idea of assuring grounding continuity in the duct assembly is carried further. In the modification of Fig. VI the clamp $C^2$ carries a large number of sharp spurs, or teats, 16 on its inner surface. As shown, these spurs or teats 16 may be struck in from the walls of the clamp. Their number and arrangement in this modified coupling clamp is such that the inset tongues or keys carried by the previously described coupling clamps are omitted. Thus in clamping together adjacent duct sections dependence is had on ability of the spurs or teats of the clamp to bite into the metal of the duct sections, and upon the compressive effect when the clamp is tightened on the sections, to give a grip of the clamp on the duct sections sufficiently firm to prevent relative movement of the duct sections in any direction.

In the modified coupling clamp shown in Fig. IV of the drawing, the structural modification over the coupling clamp C of Fig. III is less marked. In this coupling clamp $C^3$ of Fig. IV, the tongues or keys are provided by welding short lengths of suitable material, such as wire, on the inner surfaces of the clamp's sides in position to match with the cooperative grooves in the duct sections. Clearly this organization might be reversed, by forming the grooves in the clamp and attaching the tongues or keys in cooperative position adjacent the ends of the duct sections. It should similarly be understood that the organization of the tongues and grooves on the coupling clamp and duct sections may also be reversed when using a coupling clamp made as in Figs. III and V. That is, the metal adjacent the ends of the duct sections may be deformed outwardly, to form tongues, and the metal of the clamp may be deformed outwardly to form cooperative grooves.

Primarily to stiffen the structure of the duct sections, I apply bridges 18 over the open side of each duct section adjacent both ends of the section, and secure these bridges to the trough portion 1 by welding or in any other suitable manner which does not form roughness, or leave sharp edges, within the cavity of the duct section. As a simple way completely to enclose the cavities of the duct sections, I prefer to form the bridges 18 as relatively narrow walls, or metal bands, extended across the trough of the duct. In the bridge walls there are elongate indentations forming grooves 19 similar to the grooves 13 in the sides of the trough portion 1, and extended across the duct section in line with the grooves in the sides of the trough. The edge of each bridge wall, which is the more remote from the end of the duct section, is troughed or channeled across the section to present a rounded inward surface to the conductors within the duct. The cover 9 in its closed position overlies this channeled portion 20 of the bridge walls, and such other regions of the bridge walls as lie beyond the edge of the connector clamp.

Considering a complete installation of the duct, there will, or may be, used various specialized coupling clamps and duct sections, as well as specialized fittings. The general principle of clamping duct sections of the straight-away form, and of the various other forms to each other and to the fittings, is followed throughout the assembly. Various specialized forms of duct sections, coupling clamps and fittings are shown either in the illustrative installation of Fig. XVIII, or in the various detail views, description of which will now be given. Some of the specialized elements are shown both in the assembly view and in detail.

The piece-out coupling shown in Figs. VII and VIII of the drawings has for its purpose to make connection to a duct section which has been cut off in the field in accommodation to the length requirements of the run of duct in which it is included. It will be understood that if a section of duct be arbitrarily cut off, the end portion of the duct section is deprived of its bridge 18, and will consist merely of the trough 1 and cover 9.

With this in mind, the specialized clamp $C^4$ is divided longitudinally by spacers 21 welded, or otherwise suitably attached to the inner surfaces of the clamp walls. On one side of the barrier formed by the spacers the clamp wall is deformed inwardly, to provide tongues or keys 22 similar to the tongues or keys of the clamp C shown in Fig. III. On the other side of the spacer 21, set-screws 23 are mounted in bosses 24 provided by outwardly deforming the metal of the clamp. In utilizing this coupling clamp to make connection between a duct section having a terminal corresponding to the terminals of the sections A and B of Fig. I and a cut off section, a rigid rectangular collar 25 is placed at the extreme end of the duct trough, and with it in place the end of the trough is inserted into the clamp at the side provided with set-screws 23 until it comes into edge abutment with the spacers 21 within the clamp. When the clamp is closed upon the duct section, or fitting, with which it has its normal tongue and groove engagement, it also clamps around the trough portion at the other end of the duct section, and in which the collar 25 lies. Set screws 23 are then brought to bear upon the side of the collar which lies at the open side of the trough. I have found that the trough section of the duct is sufficiently deformable to permit it firmly to be clamped against the rigid interior structure of the collar, and the pressure of the set-screws on the collar firmly integrates the cut section of the duct in the assembly.

It may be explained that, if desired, the coupling clamps may be engaged to both of two complete duct sections by means of set-screws, such as set-screws 23 of the coupling clamp shown in Figs. VII and VIII. At least one side of the clamp being slightly under size with respect to the cross sectional dimensions of the duct trough, such clamping engagement is adequate normally to integrate the entire duct assembly in most installations. A clamp so equipped is less desirable than a clamp made for interlocked engagement, in that the set-screws give additional pieces upon which an operation must be performed in making the installation assembly. It does have the advantage of forming a good grounding contact between the clamp and an element against which the set-screws bear.

In Figs. IX and X of the drawings there is shown a coupling clamp $C^5$ having on all four of its sides a single tongue, or series of tongues, 26 similar to the tongues 14 arranged in two aligned series around the sides of the coupling clamp C of Fig. III. This coupling does, however, carry flanges 27 extended at right angles from one edge of each of its sides, the flange being divided on the divided side of the coupling clamp to conform to the general structure and use of the clamp. These flanges 27 are provided with bolt holes 28 by which attachment of the clamp to the wall of an outlet box or other wall, or flange, having suitably arranged perforations may be made.

In using this clamp to make connection of a duct section for example to the wall of an outlet box, the clamp is first bolted to the outlet box by means of the perforate flanges 27 of the clamp. The clamp is then engaged with an inserted end of a duct section, the engagement being made interlockingly by cooperation of the tongues 26 of the clamp and the grooves 13 of the duct section. It will be readily understood that the coupling clamp $C^5$ of Figs. IX and X may be used to make connection between one of my duct sections and a flanged rectangular duct section of the same cross-sectional bore area, so that an installation of my duct may be joined to form a continuous raceway with rectangular duct, provided with the peripheral flanges for interconnection between the duct sections.

The slip adapter D shown in Fig. XI of the drawings consists of an outer sleeve 29 having a duct piece 30 corresponding to the terminal of a standard duct section lying within the sleeve.

At one end, the sleeve is provided with set-screws 31 to secure it in adjusted position on the duct piece which it surrounds, and at its other end the sleeve itself carries an extension 32 having grooves 32a to receive the tongues of my standard coupling clamp for connection with the end of another duct section. In accommodating in the field to intervals which do not correspond with the length of any standard duct sections, the slip adapter may be used by making clamping connection of its duct piece 30 with one duct section, and by sliding the sleeve 29 along that section to project therefrom a distance suitable to make connection with the other duct section. In that position the sleeve 29 is secured to the duct piece 30 by the set-screws 31.

The end closure E shown in Fig. XII is constructed to stand end-to-end with a duct section and is of a cross section and size to match with the duct section. This fitting E is in the form of a four-sided collar, having a fifth wall 33 which in assembly lies away from the edge of the duct section to close it off. In assembly it is engaged with the duct section of my standard form by means of my standard coupling clamp, the four sides 34 of the closure piece having therein grooves 35 to receive the tongues of a standard coupling clamp.

Fig. XIII shows a short adapter nipple F purposed to make firm connection between one of my duct sections and a housing, such as an outlet box, or a flanged duct which has a bore of lesser cross-sectional area than the bore within the duct section connected to it. This adapter nipple, which is of rectangular contour, consists of a body portion 36 having on all four sides thereof a groove 37 corresponding to the grooves 13 in my standard duct sections, so that it may be engaged at the end of my standard duct section by a coupling clamp of my preferred form. Adjacent its other end, the adapter nipple has a rectangular inwardly-projectant web 38 bounding an opening 39. In web 38 there are slots 40 by which the adapter may be bolted to the wall or flange of a housing element, such as a junction box or duct section.

The adapter G shown in Fig. XIV is purposed to make connection between one of my standard duct sections and a junction box, or a tubular conduit or fitting. This adapter G is primarily rectangular in cross section, and has in one region exteriorly arranged grooves 42, formed to match with the tongues of one of my standard coupling clamps. Adjacent the edge opposite that contacted by the duct section, the adapter body is brought to a circular cross section, and is threaded at 43 for interconnection with a junction box or tubular conduit or fitting.

The duct section H shown in Fig. XV of the drawings is a T-connection having its three arms 44 rectangular in cross section, and provided with grooves 45 to match the tongues of my standard coupling clamp. The cover 46 of the section is hinged along the cross member of the T at 47, and has snap connections 48 along the curved lines joining the cross bar with the upright member of the T.

In Figs. XVI and XVII there is shown a duct section AB of extended length. Because of the extended length of this duct section, which may be assumed to be approximately twice that of the sections A and B shown in Fig. I of the drawings, it is desirable to make provision intermediately of the section for preserving adequate stiffness of both the trough and cover elements of the section. In so doing, I divide the cover length into two cover elements 49, each of which has its individual hinges 50 and engaging means 51 for holding it in closed position on the trough. These cover elements are separated from each other at the middle of the section, and in this interval I weld a bridge, such as the bridge 53, across the trough intermediately to stiffen it. This bridge 53 is desirably rolled at both its edges to provide inwardly-rounded channels 54 corresponding to the rounded channels of the bridge walls 18 of the duct sections A and B. With the cover sections 49 marginally overlying bridge 53, there is a complete closure for the duct section. By the reinforcing effect of an intermediately positioned bridge, the trough is reinforced sufficiently to give it adequate rigidity throughout its length, and the covers being made each relatively short, also possesses adequate stiffness.

Referring now particularly to Fig. XVIII of the drawings, showing an exemplary installation of my wiring duct, it will be seen that this typical installation includes not only straightaway duct sections A and B and coupling clamps C, but also includes elongate sections AB, a T-section H, a flanged coupling clamp $C^5$ making connection with a junction box J, an adapter section G making connection with a tubular conduit K, a slip adapter coupling F, and an X-connection L.

Referring also to Fig. III of the drawings, the coupling clamp C is there shown as carrying a hanger M attached to the flanges 6 of the coupling clamp by the screw-bolts 8 which bolt those flanges together to give a compressive grip on the duct sections. As shown, the hanger M is the shape of an inverted letter L, and has in one of its legs slots 55 and 56 extended at right angles to each other to give selectivity in the attachment of the hanger to a mounting surface, or supporting element, and has additionally screw holes 57 for the same purpose. The side 3 of the clamp C is also provided with screw-holes 58 for direct attachment to a mounting surface or to a mounting bracket. The form and arrangement of the hanger may be widely varied, the pertinent point to consider being that matching lugs of the clamp provide in simple manner in one side of the clamp adequate provision for engaging the hanger to the clamp. At all other sides of the clamp there is no substantial projection to space the duct assembly away from a wall or ceiling close to which it is desirable for the duct to lie.

In installation the duct may be placed in any position with respect to a wall, ceiling, or floor, which gives space for the cover to open. In accordance with the locality of the duct mounting, the duct may be arranged with the covers of the duct sections as the base, top, or sides of the duct, as may be most convenient under all the circumstances. With a duct which is rectangular in cross-section, and the sides of which are equal, as herein shown, and with clamps of corresponding contour, the clamp may be so arranged on the duct sections that it engages a hanger at any side of the duct, and does not serve as a spacer for the duct at any other side. This of itself gives my clamped assembly great advantage over otherwise integrated assemblies of "square duct." My clamped duct assembly may, however, with general advantage include duct sections and fittings which are other than square in cross-section, such as rectangular duct sections only the opposite sides of which are of equal length, and hexagonal or octagonal duct sections or fittings. In all such polygonal forms other than square any decrease in convenience over the square form is attributable only to the cross-sectional contour of the duct sections, since the clamp may readily be modified as to the relative length and number of its sides in accordance with the cross-sectional contour of the duct sections, and may readily be hinged, or otherwise suitably articulated at the most desirable points. In any polygonal form the clamp need have projection from one only of its sides.

Fig. XIX of the drawings shows the mounting of duct sections both with and without using the lugs 6 of the clamps for the attachment of hangers. In that view the four duct sections shown are designated as A, A', B and B'. The duct A is shown suspended from a ceiling 59 by the hanger M of Fig. III attached to the lugs 6 of the clamp C; the duct A' is shown as suspended from the ceiling by a flanged U-shape bracket N attached at the screw holes 58 in one side of the clamp C; the duct B is shown bracketed out from the wall 60 by a similar bracket N; and the duct B' is shown attached directly to the wall 60 by screws passed through the screw holes 58 of the clamp. This view is illustrative of but a few of the varied attaching means by which the duct may be mounted, and of but a few of the positions of the duct with respect to a wall, ceiling, or floor on which it is mounted.

There is a great advantage of my duct, regardless of its cross-sectional contour, in the fact that the coupling clamps so embrace adjacent duct sections and fittings that a fastening operation is required in only one region around the duct. That is, screw bolts need be applied only at the matching lugs standing at one side of each coupling clamp. In installation, the duct assembly may therefore be integrated merely by applying the coupling clamps, and by bolting them through their lugs. There is further advantage in making an assembly for installation, in the fact that two adjacent duct sections are positioned to each other as soon as a coupling clamp is applied to them and before the lugs of the clamp are bolted, and in the fact that a hanger may be applied at any clamp without destroying the connection function of the clamp while attaching the hanger. Also when an installation has been made, accidental loosening of the bolts in a coupling clamp does not necessarily impair the connection between two duct sections coupled by the clamp.

A number of terms used herein are terms of definition and not of limitation. Thus by the term "duct section" I intend to include all the various shapes of housing lengths, fittings, connectors, adapters, and the like, provided each such duct element has at least one end brought to uniformity in cross-sectional contour and size with the ends of other duct elements for connection therewith by the coupling clamp cooperative with both. The term "accessible," as herein used to qualify a wiring duct, means that the duct is of a sort which is adapted to be mounted in an available position, and access to the interior of which may easily be had whether or no access openings be specifically provided in the duct structure.

I wish to call particular attention to the fact that the duct sections in themselves are rigid and that a rigid assembly in, or for installation, is made when they are clamped together. Because of the individual rigidity of the duct sections and the rigidity required of the assembly, the problems encountered in the interconnection of duct sections and in the mounting of the duct assembly are exacting. It should also be emphasized that the organization of the clamps, covers for the duct sections, and other elements is such that the interior of the duct sections in the assembly is readily accessible, and that in mounted installation of the assembly it is easy and practical to accommodate the mounted position of the duct to ready access to the interior of the duct.

I claim as my invention:

1. An accessible electrical wiring duct assembly including two polygonal and equi-lateral duct sections arranged end-to-end, a strap-form clamp embracing both duct sections in the region of their adjacent ends to lie save at one point thereof substantially flush with the wall surfaces of the duct and having with both sections interlocking engagement securing the duct sections against movement relative to each other, and matching engagement lugs at one point on the duct embracing length of the said strap-form clamp arranged to stand up from a side of the duct, said clamp being adjustable around the duct to bring the said engagement lugs to any selected side thereof.

2. For incorporation in a wiring duct assembly a duct section including a polygonal trough having an open side, bridges over the open side of the trough adjacent its ends, deformations in the trough walls adjacent their ends and in said bridges organized to provide interlocking engagement with a section-connecting structure, and a cover organized on said section to overlie the open side thereof and partially to overlie both of said bridges.

3. An electrical wiring duct assembly including two polygonal duct sections arranged end-to-end, at least one of said sections having an open side and bridging structure over the said open side at the end of the section adjacent the end of the other section, an interconnecting clamp embracingly engaging both said duct sections at their adjacent ends partially to overlie the sides of both sections and the bridging structure at the end of either section, deformations in the said clamp and in at least one of the surfaces of the walls of each duct structure and in the bridging structure, said deformations providing interlocking engagement between both duct sections and the said coupling clamp, and a cover on the open-sided duct section arranged to overlie the open side of the duct section and partially to overlie the bridge thereof.

4. A coupling clamp organized to interconnect two duct sections which are rectangular in cross-section, formed as a jointed rectangular band having one side thereof divided intermediate its length and the side thereof opposite the said divided side hinged at both ends to the adjacent other sides of the clamp, at least one side of the said clamp having therein deformations purposed to match with deformations on duct sections connected by the clamp.

5. A coupling clamp organized to interconnect two duct sections which are polygonal in cross section, formed as a jointed polygonal band having one side thereof divided intermediate its length and having at least two hinged joints between adjacent sides of the said clamp, at least one side of the said clamp having therein deformations purposed to match with deformations on duct sections connected by the clamp.

JOHN E. HUGUELET.